Figure 1:
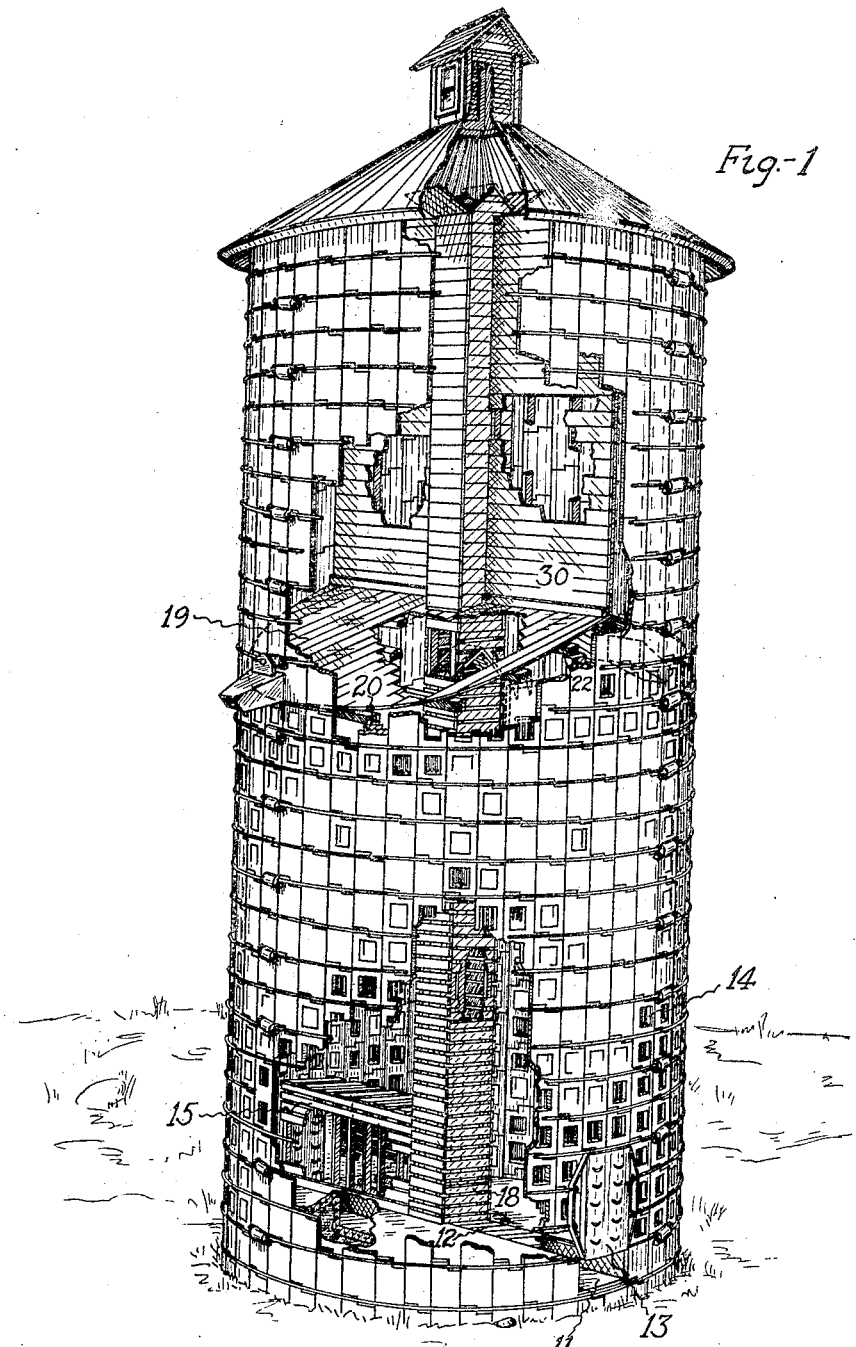

G. B. READ.
GRAIN CRIB.
APPLICATION FILED OCT. 28, 1921.

1,428,710.

Patented Sept. 12, 1922.
2 SHEETS—SHEET 1.

Witnesses
Chas. A. Barnett

Inventor
George B. Read
By Jefft & Jefft
Attorney

G. B. READ.
GRAIN CRIB.
APPLICATION FILED OCT. 28, 1921.
1,428,710.
Patented Sept. 12, 1922.
2 SHEETS—SHEET 2.
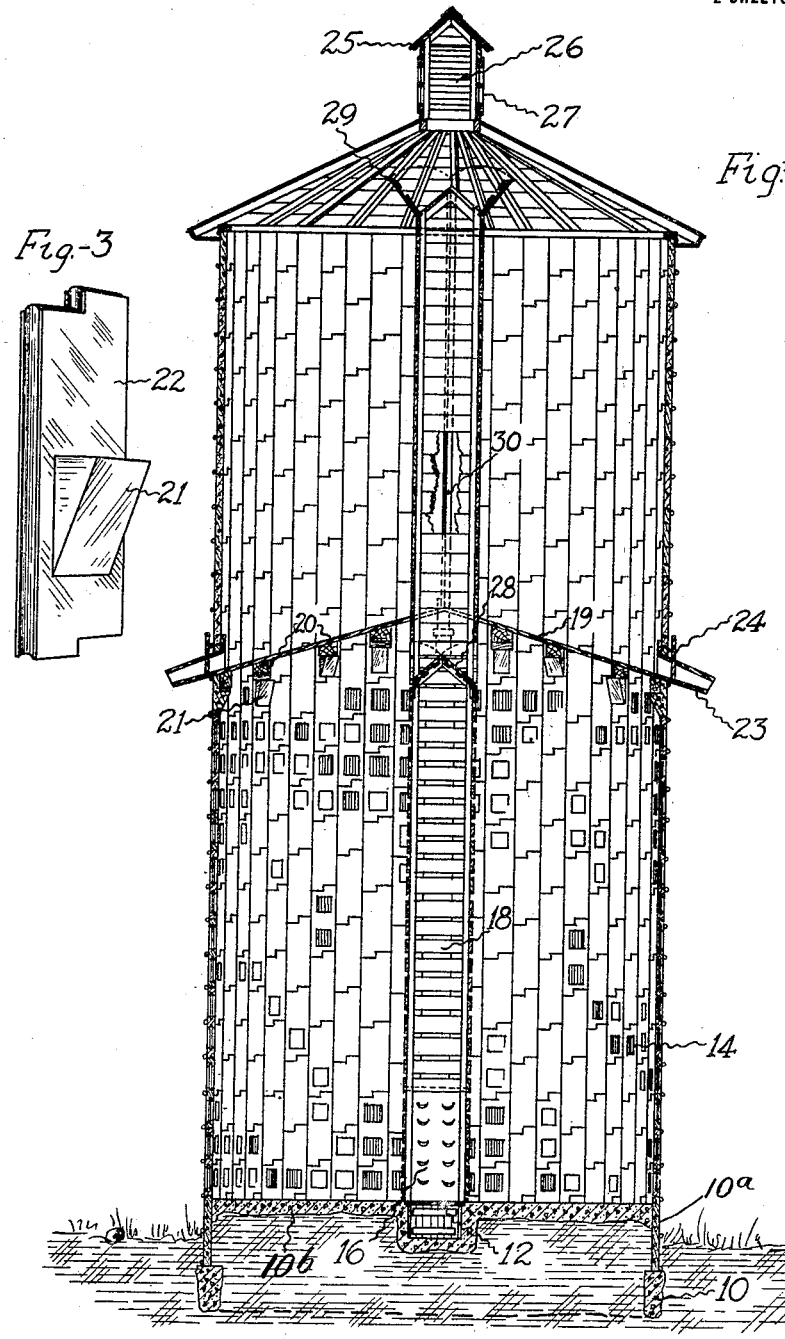
Witnesses
Chas. A. Barnett
Inventor
George B. Read
By Jeff & Jeff
Attorney Patented Sept. 12, 1922.

1,428,710

UNITED STATES PATENT OFFICE.

GEORGE B. READ, OF BLOOMINGTON, ILLINOIS.

GRAIN CRIB.

Application filed October 28, 1921. Serial No. 511,204.

*To all whom it may concern:*

Be it known that I, GEORGE B. READ, a citizen of the United States of America, residing at Bloomington, in the county of Mc-Lean and State of Illinois, have invented certain new and useful Improvements in Grain Cribs, of which the following is a specification.

My invention relates to grain cribs.
My invention has special reference to a crib built in circular form and employing in its structure comparatively thin concrete staves, or sections, without using any plastic material, such staves being sustained and held in proper position and relation within the structure by means of hoops or bands.

The principal object of my invention is to provide a crib for housing both ear corn and small grain in a comparatively small circular crib built up of stave members.

The invention consists in the combination in a circular crib of a lower, or ear corn section, built up of ventilated stave sections and an upper small grain section built up of solid staves, and associated ventilating means to facilitate air circulating through the ear corn section, but not through the upper or small grain section, although a ventilating stack for the ear corn section passes through the small grain bin. This ventilating means, in passing through the small grain bin, is closed until it reaches practically the cupola of the crib. In the drawings, Fig. 1 shows a side elevation of the complete crib structure, with parts broken away to show details of interior construction. Fig. 2 is a longitudinal sectional view of the crib. Fig. 3 is a detailed view of one of the stave sections having a supporting ledge integrally formed therewith.

My invention includes a special form of partition between the ear corn and small grain sections of the crib, whereby a ready deflection of the latter is facilitated to discharge points in the circumferential wall of the crib.

My invention further includes detailed matters of structure hereafter particularly pointed out in the claims.
In the practical art relating to cribs and silos it has been the practice that when circular structures were to be built to be utilized as silos that solid blocks alone have been employed in developing such structures, and when developed for use to house ear corn, ventilated stave sections alone have been employed. In the structure herein exemplified, I have developed a plan of utilizing a comparatively small circular structure, built up of stave sections, that will house and successfully preserve both ear corn and small grain.

Referring to the drawings:—10 is a concrete base or footing, 10ª are stave members, and 10ᵇ is a concrete floor provided with a transverse open way, 11 therein. 12 are covering sections for the top of said opening or way 11, the same being formed in separate sections, adapted to be removed, to facilitate the discharge of ear corn into the sheller drag. 13 is a door-way provided to facilitate entry into the lower portion of the ear corn section of the crib to facilitate initial discharge of corn therefrom. 14 refers generally to ventilating stave sections. Built up over one side of a portion of the transverse open way 11, is an enlarged entry way 15, having its outer end communicating with a door 16, similar to the one shown at 13. This entry way has its upper and side portions ventilated in a manner similar to the ventilating stack, to be described later. 18 is a ventilating stack which may be developed in any form desired, but as here shown, comprises relatively spaced vertically disposed framing members connected by short-board sections suitably spaced apart to permit free entry of air into the stack. This ventilating stack, as shown in Fig. 1, of the drawings, has only its lower portion ventilated and the upper section, or rather the section passing through the small grain bin is closed for obvious reasons. 19 are floor or partition sections, shaped respectively to conform to the shape of the crib wall and inclined from a central transverse line through the crib body to, and in abutment with the interior face of the crib wall, said partition members 19, being supported at intermediate points between the ridge and the wall, by transverse members 20, which have their ends supported upon the projecting ledges 21, on suitably positioned stave sections 22, as shown in Fig. 3 of the drawings. These stave sections 22, have the supporting or projecting ledge 21, integrally cast therewith and are specially formed for this particular portion of the crib. Fig. 2 of the drawings shows clearly the mounting of these staves. 23 are chute members constructed of any suitable material and entered and secured in conformatory openings, in the crib wall and positioned, their lower portions, in line with the floor or partition members 19, and at approximately the center point of the arc described by the outer edge of said floor or partition members, whereby grain deposited in the small grain sections of the crib will be gravitated towards the discharge openings and also will be deflected, by the walls of the crib, towards the centrally disposed discharge chutes 23. The closure of the discharge chutes is controlled by valve members, as 24.

As shown in the drawings, the lower or ear corn section of the structure employs ventilated staves for its wall portion, and the upper portion, or where the small grain is housed, has its walls formed by solid stave sections. At the peak of the roof of the crib structure, a super-imposed housing 25, may be provided, having the usual ventilating ways, 26, and, in this instance, also openable window members 27, whereby entry of a grain elevating member may be made to facilitate discharge of small grain or ear corn into their respective compartments. The ventilating stack 18, has mounted, or rather hinged, therein, at an intermediate point thereon, hinged door members 28. These door members are located in the ventilating stack just beneath the floor or partition members 19, and are hinged in such manner that when thrown outwardly, they form a portion of the ventilating stack, but when in their inward position, close the ventilating stack, whereby openings are left for the ear corn to pass into the crib.

Again at the top of the ventilating section is shown door members 29 which may be thrown to an inward position to form a closure for the ventilating stack, or to an outward position, whereby the ventilating stack acts as a means for transmitting the ear corn to the lower or corn crib section.

To more clearly bring out the functions of the door members, we may say that it is the usual custom to project the upper section of an outside elevator member into the openable windows 27, in the cupola, whereby either small grain or ear corn may be discharged thereinto. Should it be desirable to fill the corn crib, the upper door members 29, are opened, and the lower door members thrown to their inward, or closed position, with the result that ear corn discharged into the upper end of the ventilating stack, will strike against the lower door members and carom off into the corn crib. When the corn crib has been sufficiently filled, the door members 28, are thrown outwardly, forming a walled portion of the ventilating stack, whereupon said stack is able to function in its normal way.

When it is desired to fill the small grain section or bins, the upper door members 29, are thrown in their inward or closed position and small grain is delivered by the outside elevator to the cupola, and caroms off the closed doors into the grain bins. A wall portion is shown at 30 in the small grain section, but this is not a necessity unless different kinds of small grain are to be housed.

What I claim is:

1. In a concrete stave grain crib, in combination, a corn crib section formed by sections of super-posed stave members having ventilating openings, a grain bin section mounted thereabove and formed by super-posed sections of solid stave members, a roof for the grain bin section, having a cupola provided with ventilating openings therein, transverse partition members between the corn and grain bin sections, and a vertically disposed stack open at its upper end, and having in its lower portion within the corn crib section ventilating openings.

2. In a concrete stave grain crib, in combination, a corn crib section formed by sections of super-posed stave members having ventilating openings, a grain bin section mounted thereabove, and formed by sections of super-posed solid stave members, a covering for said grain bin having a ventilated portion therein, transverse partition members between the corn and grain crib sections, and a vertically disposed stack, having in its lower portion within the corn crib ventilating openings, said stack having a plurality of hinged door members, disposed thereon at its intermediate and upper ends respectively.

3. In a grain crib, in combination, a base section formed of stave members provided with ventilating openings therein, a super-posed small grain section mounted thereabove and formed of solid stave members, said section being provided with discharge ways therefrom, a partition between said sections, a stack extending through both crib sections, the portion of said stack that lies within the corn crib section, being provided with ventilating openings therein and oppositely disposed grain entry ways at its upper portion, deflector and closure members for said openings, swingable for closure or inwardly for relative contact for deflection of corn discharged into the upper end of the stack for delivery to the corn crib section, angularly disposed closure members for the upper end of the stack, functioning, when open, to permit discharge of ear corn within the stack and, when closed, to deflect small grain to the upper crib section, and a suitable roof closure portion for the crib provided with an entry way for the admission of grain.

4. In a concrete stave grain crib, in combination, a corn crib section formed by sections of super-posed stave members provided with ventilating openings, a grain bin section mounted thereabove and formed by super-posed sections of solid stave members, a roof for the grain bin section, having a cupola provided with ventilating openings therein, transverse partition members between the corn and grain crib sections, and a vertically disposed stack therein, acting as a ventilator for the corn crib section, and having a series of hinged door members thereon, said door members forming means for filling either the corn crib or grain bin section.

5. In a grain crib, in combination, a base section formed of stave members provided with ventilating openings therein, a super-posed small grain section mounted thereabove and formed of solid stave members, said section being provided with discharge ways therefrom, a partition between said sections, a stack extending through both sections, the portion of said stack that lies within the corn crib section being provided with ventilating openings therein, and oppositely disposed grain entry ways at its upper portion, deflector and closure members for said openings, swingable for closure or inwardly for relative contact for deflection of corn discharged into the upper end of the stack for delivery to the corn crib section, and a suitable roof closure portion for the crib provided with an entry way for the admission of grain.

6. In a cylindrical concrete stave grain crib, in combination, a corn crib section, formed by sections of super-posed stave members provided with ventilating openings, a grain bin section, mounted thereabove, and formed by super-posed sections of solid stave members, a covering for said grain bin, and a plurality of transverse partition members between the corn and grain crib sections, shaped respectively to conform to the shape of the crib wall and inclined from a transverse line through the crib body, to, and in abutment with the interior face of the crib wall, whereby grain deposited in the grain crib will be gravitated to suitably disposed chutes therein.

7. In a grain crib, in combination, a circular base support provided with a floor portion, a corn crib section formed of plural ventilated stave members, extending upwardly a portion of the height of said crib, certain of said stave sections being fashioned with off-set portions, a superposed small grain section formed of solid stave members, a partition intervening between the two crib sections, comprising meeting and relatively outwardly inclined portions suitably mounted for support in connection with the off-set portions of stave members, a stack member disposed vertically within the crib sections, that portion of said stack lying within the corn crib section being provided with ventilating openings, and a roof closure for the crib.

8. In a concrete stave corn crib, in combination, a base member having a transverse drag way therein, a corn crib section formed of super-posed sections of staves having ventilating openings, a grain crib section, formed of super-posed sections of solid stave members, partition members disposed between the grain and corn crib sections, a ventilator stack, a door-way in the corn crib section, disposed above the drag way, and an entry compartment communicating with the ventilator stack and the door-way.

In testimony whereof I have affixed my signature.

GEORGE B. READ.